US012767036B2

(12) United States Patent
Nunes Da Silva Filho et al.

(10) Patent No.: US 12,767,036 B2
(45) Date of Patent: Oct. 20, 2026

(54) STRUCTURAL ARRANGEMENT FOR A STRUCTURE FOR SECURING A METAL COIL

(71) Applicant: VIX LOGÍSTICA S.A., Vitória (BR)

(72) Inventors: Antonio Nunes Da Silva Filho, Vitória (BR); Elias Alves Da Silva, Vitória (BR); Marcos Antonio Nunes Da Silveira, Vitória (BR)

(73) Assignee: VIX LOGÍSTICA S.A., Vitória (BR)

( * ) Notice: Subject to any disclaimer, the term of this patent is extended or adjusted under 35 U.S.C. 154(b) by 479 days.

(21) Appl. No.: 18/264,001

(22) PCT Filed: Feb. 1, 2022

(86) PCT No.: PCT/BR2022/050032
§ 371 (c)(1),
(2) Date: Aug. 2, 2023

(87) PCT Pub. No.: WO2022/165575
PCT Pub. Date: Aug. 11, 2022

(65) Prior Publication Data
US 2024/0116425 A1 Apr. 11, 2024

(30) Foreign Application Priority Data
Feb. 4, 2021 (BR) .......................... 2020210021166

(51) Int. Cl.
*B60P 7/12* (2006.01)

(52) U.S. Cl.
CPC ..................................... *B60P 7/12* (2013.01)

(58) Field of Classification Search
CPC ......................................................... B60P 7/12
See application file for complete search history.

(56) References Cited

U.S. PATENT DOCUMENTS 1,850,597 A * 3/1932 Mcguire .............. B61D 45/003 410/48
2,622,918 A * 12/1952 Staffe ...................... B60P 3/035 410/48

(Continued)

FOREIGN PATENT DOCUMENTS

| | | | |
|---|---|---|---|
| CN | 101272968 | A | 9/2008 |
| DE | 3514975 | C2 | 10/1986 |

(Continued)

OTHER PUBLICATIONS

International Search Report of corresponding PCT/BR2022/050032, including translation, mailed Mar. 23, 2022.

*Primary Examiner* — Jonathan Malikasim
(74) *Attorney, Agent, or Firm* — Leason Ellis LLP

(57) ABSTRACT

The utility model in question presents a new constructive arrangement introduced in structure for fixation of metal coil and, more particularly, a structure able to be arranged and fixed to a loading platform of any means of transport, and also able to be removed from said loading platform of any means of transport, said structure being developed to increase the safety of the transport of the coil, guarantee that the coil will not shift during transport, facilitate the access to the coil by overhead cranes and avoid the coil unwinding in case of rupture of the binding.

1 Claim, 5 Drawing Sheets

(56) References Cited

U.S. PATENT DOCUMENTS

| | | | | |
|---|---|---|---|---|
| 2,958,492 | A * | 11/1960 | Maynard | B65D 85/66 211/44 |
| 2,977,900 | A * | 4/1961 | Farrar | B61D 39/00 220/678 |
| 3,061,255 | A * | 10/1962 | Gallo | B61D 45/003 410/48 |
| 5,622,116 | A * | 4/1997 | Carlton | B60P 3/035 296/25 |
| 6,190,100 | B1 * | 2/2001 | Mawji | B60P 7/12 410/47 |
| 8,277,155 | B2 | 10/2012 | Anderson | |
| 8,322,956 | B2 * | 12/2012 | Strang | B66F 19/00 410/32 |
| 9,387,864 | B2 | 7/2016 | Lydic et al. | |
| 11,407,559 | B2 * | 8/2022 | Hamner | B65H 75/02 |
| 11,535,282 | B2 * | 12/2022 | Latourrette | B61D 3/166 |
| 2004/0009050 | A1 * | 1/2004 | Rediehs | B61D 45/003 410/47 |
| 2011/0248141 | A1 | 10/2011 | Lee | |
| 2019/0241353 | A1 * | 8/2019 | Reedy | B21C 47/22 |

FOREIGN PATENT DOCUMENTS

| | | | |
|---|---|---|---|
| EP | 093018 | B1 | 9/1999 |
| FR | 2913380 | A1 | 9/2008 |
| WO | 2018/131049 | A1 | 7/2018 |

* cited by examiner

STRUCTURAL ARRANGEMENT FOR A STRUCTURE FOR SECURING A METAL COIL

FIELD OF THE UTILITY MODEL

The utility model in question presents a new constructive arrangement introduced in structure for fixation of metal coil and, more particularly, a structure able to be arranged and fixed to a loading platform of any type of means of transport, and further able to be removed from the referred loading platform of a means of transport, said structure being developed to guarantee that the coil does not shift during the transport thereof.

Fundamentals of the Utility Model

As is known by those skilled in the art, the metal coil manufacturing industries—particularly the steel sheets manufacturing industries—tend to generate, as final product metal coils, which comprise long metal sheets rolled in multiple layers. Consequently, there exists a market segment specially dedicated to the transport logistics of these metal coils, which must be transported from the origin thereof to their final destination (manufacturing industries in general, which use said metal coils as raw material).

Thus, it is common to observe that the current state of the art covers a series of technical solutions designed at optimizing logistics of the transport of the metal coils.

Among these solutions, North-American U.S. Pat. No. 6,923,608 presents, as a common technical solution at the time of filing thereof, the possibility of transporting the metal coils in mobile platforms associated to large vehicles (trucks and railway compositions, to cite only two examples). For this purpose, said mobile platforms must include at least two positioning rails spaced apart so as to accommodate a metal coil and at least one binding medium (usually a chain or high strength textile tape) able to bind the metal coil relative to the mobile platform.

Considering that the metal coils usually weigh up to 36 tons, it is evident that the technical solution described above is quite ineffective, after all, all the weight of the metal coil is sustained solely by the binding means, after all, the positioning rails have only the function of maintaining the position of the metal coil without exerting, for all purposes, any support or containment function for the referred metal coil. In this sense, it is important to emphasize that in the eventuality of rupture of the binding means, the metal coil tends to be completely loose, and this means a great risk to the integrity of the metal coil and, more seriously, a great risk to the surroundings, being subject to the risk of accidents which can cause severe damages to assets or even loss of life.

Aiming at minimizing these risks, said North American U.S. Pat. No. 6,923,608 discloses a technical solution wherein the mobile platform itself associated to the large vehicle, undergoes technical alterations. For better clarification, the solution proposed in North American U.S. Pat. No. 6,923,608 is illustrated (with small adaptations from the original figures of said North American U.S. Pat. No. 6,923,608) in the attached FIGS. 1 and 2.

Thus, such as illustrated in FIG. 1, the technical solution described in North American U.S. Pat. No. 6,923,608 covers a mobile platform MP which comprises a recessed portion RP able to position a metal coil MC. As it is possible to observe, said recessed portion RP can be considered as a replacement for the positioning rails. At least two mobile shoring structures MSS1 and MSS2 are also foreseen, able to be arranged in an inactive position or an active position (see in FIG. 1, the mobile shoring structure MSS1 is in the inactive position and mobile shoring structure MSS2 is in the active position), and tend to perform physical contact with small lower passages of the faces of the metal coil MC so as to avoid involuntary shifting of said coil in the longitudinal direction to the recessed portion RP. In addition to the mobile shoring structures and the recessed portion, the technical solution described in North American U.S. Pat. No. 6,923,608 further predicts the use of a traditional binding medium.

Although the technical solution described in North American U.S. Pat. No. 6,923,608 represents an evolution in face of the trivial solution previously described, it is also possible to notice some aspects subject to improvement and/or limiting aspects. One of the main limiting aspects is related to the fact that the mobile platform, precisely by containing at least one recessed portion, is only suitable for the transport logistics of metal coils and, more particularly, to the logistics of the transport of metal coils having dimensions that are compatible with the general dimensions of the recessed portion. One of the main aspects subject to improvement is related to the fact that the mobile shoring structures require human intervention to change between the inactive and the active positions. Consequently, all the efficiency of said mobile shoring structures is, in one way or another, dependent on the human factor. Additionally, it is also evident to notice that said mobile shoring structures are essentially fragile relative to the general characteristics of the metal coils.

Moreover, as particularly illustrated in FIG. 1, one of the alternative embodiments of the technical solution proposed in North American U.S. Pat. No. 6,923,608 further includes mobile protection structures MPS especially dedicated to the protection of the metal coils from weather hazards. Such as illustrated, the mobile protection structures MPS can also be arranged in an inactive position or in an active position, for which reason their questionable efficiencies also depend on the human factor.

It is based on this scenario that the utility model in question appears.

Objectives of the Utility Model

It is the main purpose of the utility model in question to disclose a constructive arrangement introduced in structure for fixation of a metal coil able to be attached to any type of mobile platforms associated to large vehicles. In this sense, the main purpose is that said structure for fixation of the metal coil can be coupled and uncoupled easily from mobile platforms associated to large vehicles.

It is also one of the purposes of the utility model that the structure for fixation of the metal coil presents an excellent retention means for the metal coils whereby said retention is independent from the human factor.

It is further one of the purposes of the utility model in question that the structure for fixation of a metal coil is able to minimize the problems originating from the eventual rupture of the binding means of the metal coil.

Summary of the Utility Model

All the purposes mentioned are reached by means of the constructive arrangement introduced in structure for fixation of metal coil, which comprises at least one laying base; at least one locking device; said constructive arrangement introduced in structure for fixation of metal coil being defined by the laying base comprising two symmetrically opposed platforms inclined toward the central plane CP of the laying base; at least two containment devices, said containment devices comprising at least one structural reinforcement device; each one of said containment devices comprising a least one concave region centered with the central plane CP of the laying base.

BRIEF DESCRIPTION OF THE FIGURES

The constructive arrangement introduced in structure for fixation of metal coil is better described with reference to the figures listed below.

DETAILED DESCRIPTION OF THE UTILITY MODEL

According to the objectives of the utility model, there is described a constructive arrangement introduced in structure for fixation of metal coil; said structure being especially developed to be associated to the loading platform of a vehicle, preferably a large vehicle, as for example: trucks; trailers; or even railway transportation.

Figure 3:
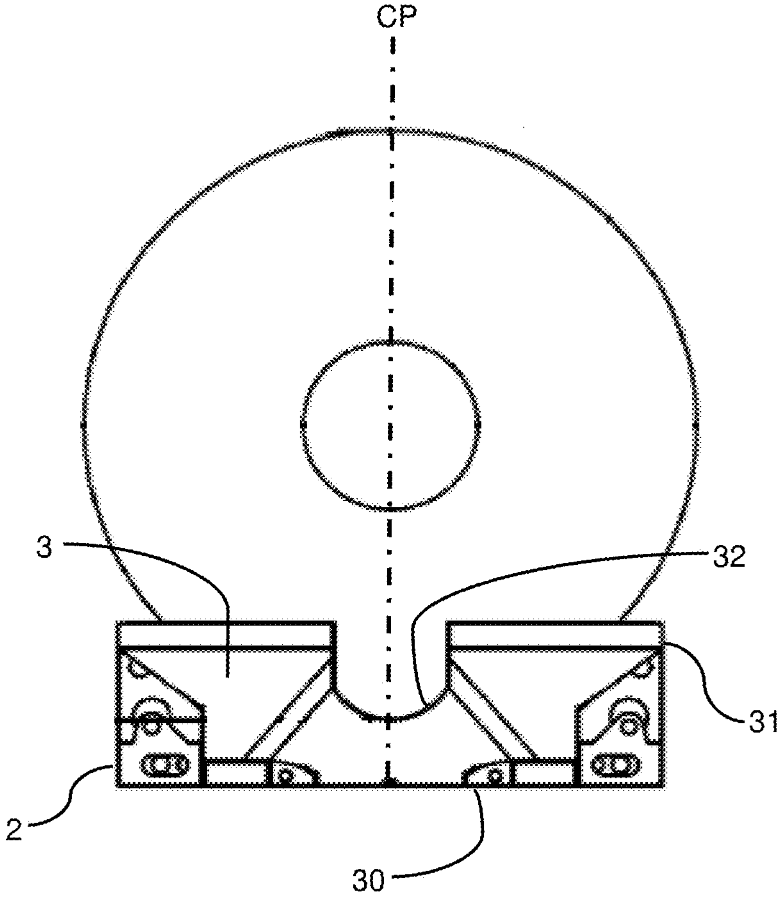
FIG. 3 illustrates a front view of the structure for fixation of coils of the present model, transporting a coil.

The structure for fixation of metal coil of the present model comprises at least one laying base 1 which directly receives the metal coil. The laying base 1 comprises two adjacent platforms 10, symmetrically opposed and inclined toward the central plane CP of the laying base 1, as can be observed in FIG. 3.

In a preferred embodiment, the inclination of the platforms 10 can be adjusted in an independent manner, remaining preferably in the range of 15° and 60° inclination.

It is important to observe that the platforms 10 are adjacent, that is, they are in the central plane CP of platform 1, which is reflected in the reduction of the dimensions of the structure. Moreover, and as can be observed from FIGS. 3 and 4, the structure proposed in the present utility model is able to receive any dimensions of metal coils, without shifting thereof during transport. More specifically, it is observed that the inclination of the platforms 10 does not allow the coil to roll to any of the sides, since the coil is at all times, supported by the platforms.

Figure 1:
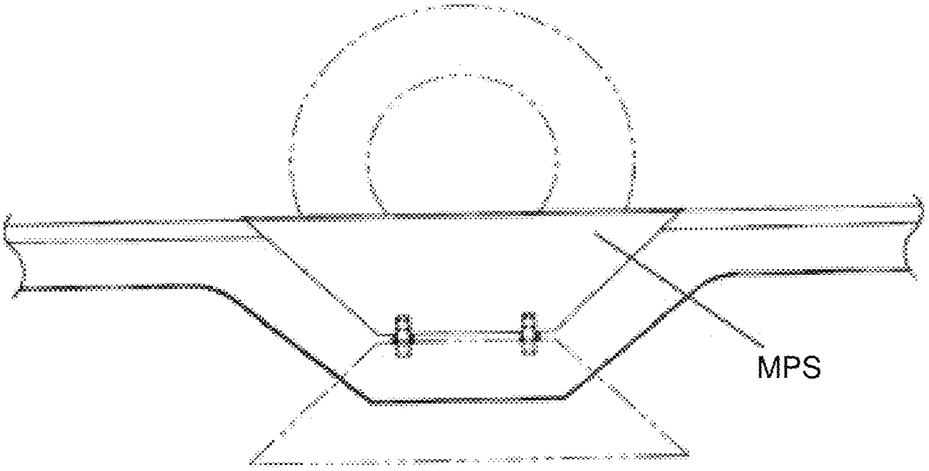
Prior Art FIGURE 1
FIG. 1 illustrates a front view of a structure for fixation of the coils from the state of the art.

This guaranty of non-shifting of the coil during transportation is not observed, for example, in the structure proposed in the example of the state of the art disclosed in FIG. 1. This is because, in the platform of the structure of FIG. 1, there exists a central plane region, just below an access device. In case the coil has reduced dimensions, it can roll to the sides, not being supported by the side platforms of the proposal in FIG. 1.

Here it is important to once more emphasize the possibility of rupture of the binding of the metal coil, which, as described, represents a severe risk to the integrity of the metal coil, and, more seriously, a great risk to the integrity of the surroundings (objects and people). The platforms 10 guarantee that, in case of rupture of the binding, the metal coil will not completely unwind, as it is partially covered by the platforms 10.

Notwithstanding, rubber plates can be positioned over the platforms 10, increasing the friction between the coil and the platforms, whereby this increased friction increases the immobility of the coils in case of rupture of the binding.

Returning to the present model, the fixation structure comprises at least one locking device 2, located on the lower part of the fixation structure. These locking devices 2 are commonly known in the state of the art as "locks for containers" The locking devices 2 have the purpose of guaranteeing that the fixation structure does not move when in transport over the cargo vehicle.

Figure 2:
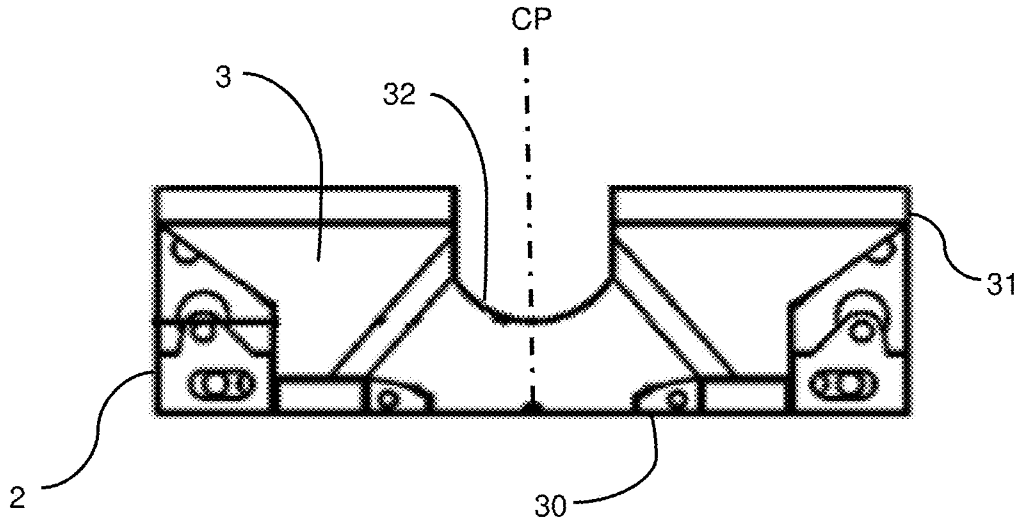
FIG. 2 illustrates a front view of the structure for fixation of coils of the present model.
Figure 4:
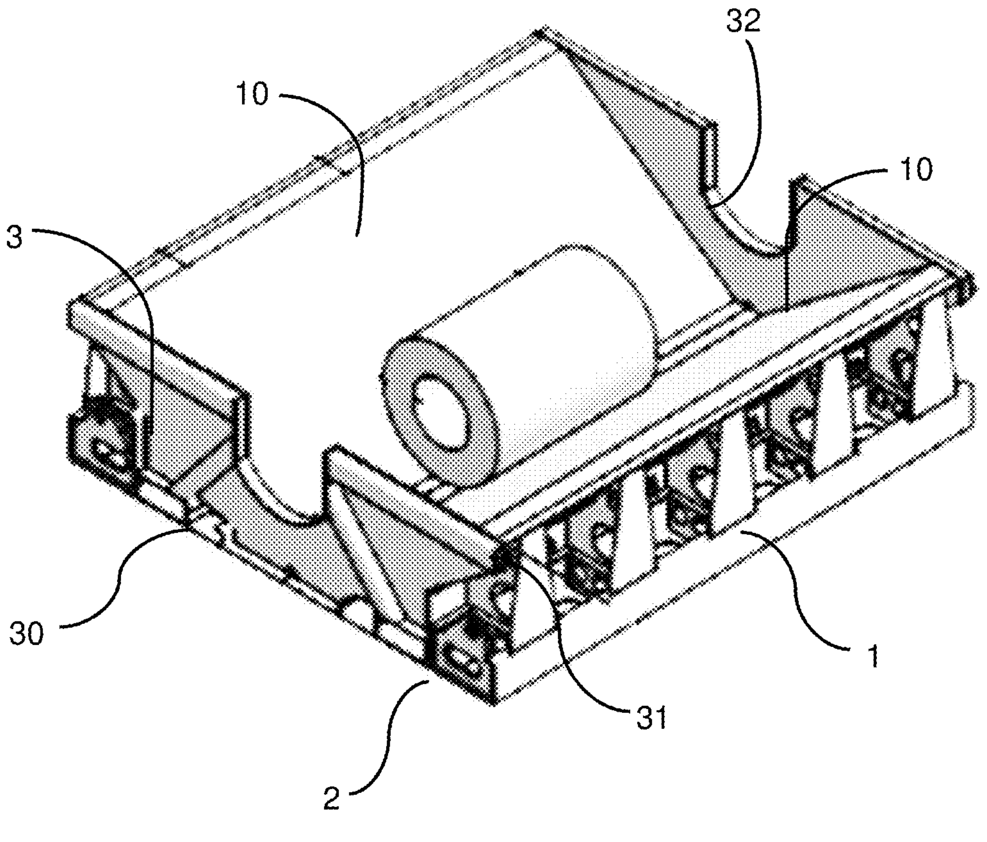
FIG. 4 illustrates an upper perspective view of the structure for fixation of coils of the present model transporting a coil having reduced dimensions.
Figure 5:
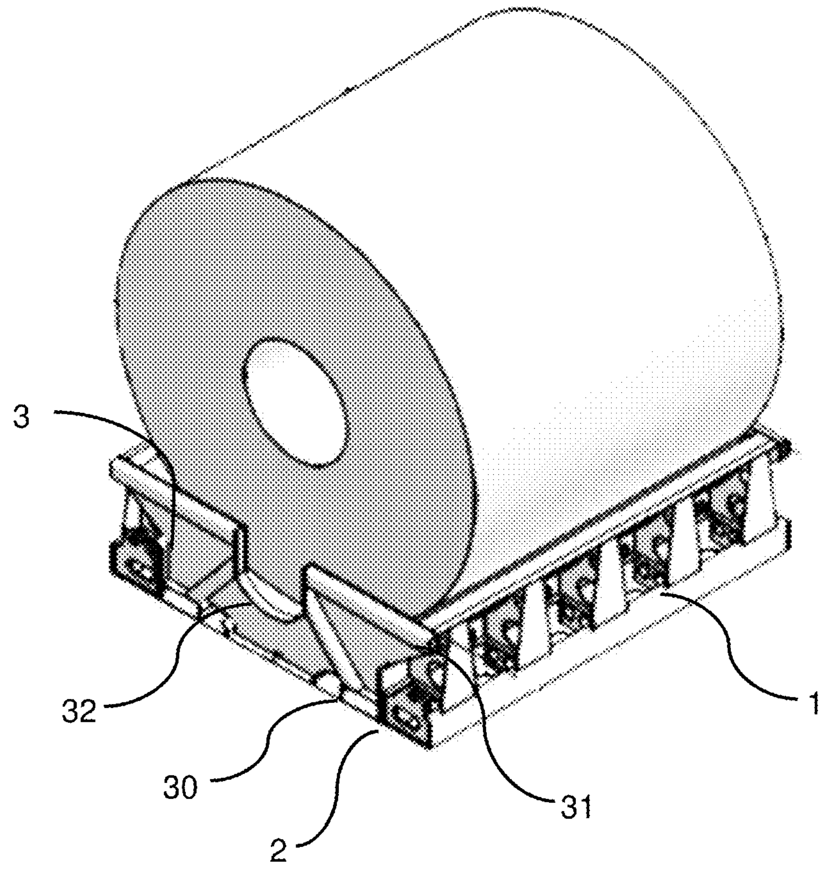
FIG. 5 illustrates an upper perspective view of the structure for fixation of coils of the present model transporting a coil having large dimensions.

Moreover, the fixation structure herein proposed comprises at least two containment devices 3 symmetrically opposed, as seen in FIGS. 2 and 4, the containment devices 3 being dimensioned adequately, considering the weight and dimensions of the coil, so as to guarantee the side locking of same during transportation, with no risk of falling, which in turn can be induced by the dynamic loads occurring during the transport, whereby the same has the clippings adequately positioned so as to allow the handling of the cargo without human intervention.

The containment devices 3 are particularly provided to facilitate the access to the metal coils and, further, to guarantee that the coils will not fall over during transport. This is because, during transport, the coils are positioned so that central bolt is perpendicular to the longitudinal axis of the cargo, that is, the coil bolt is placed perpendicularly to the displacement direction of the vehicle which, during an acceleration or braking, can cause the fall of a coil.

The articulation points 30 are placed on the lower part of the containment devices, causing said containment devices, when open, to remain positioned at the base level of the fixation structure.

In its turn, preferably, each containment device 3 comprises at least two structural reinforcement devices 31, positioned on the upper side part of the containment device. The structural reinforcement devices 31 are robust latches that guarantee that the containment devices 3 will not open during transport.

Finally, each one of said containment devices 3 comprises a concave region 32 centered with the central plane CP of the laying base 1. This concave region 32 has the function of facilitating (not restricting) access to the bridge crane tongs at the time of loading and unloading of the coils, even when the containment devices 3 are closed. For clarification, the tongs are objects widely known to the state of the art and are responsible for the handling of the objects moved by the overhead cranes.

Additionally, the concave region 32 facilitates the passage of any additional fixation elements for the coils, such as for example chains which can be passed through the bolt of the coils.

Thus, it is evident that the fixation structure proposed in the present utility model presents an excellent manner of containment of metal coils, guaranteeing safety during transport, ease of access to the coils by overhead cranes and safety in case of rupture of the bindings of the coils.

It is important to highlight that the above description has the only purpose of describing in an exemplificative manner the particular embodiment of the present utility model. Thus, it is clear that modifications, variations, and constructive combinations of the elements that carry out the same function in the same manner substantially to achieve the same results, continue within the scope of protection limited by the attached claims.

The invention claimed is:

1. A constructive arrangement introduced in structure for fixation of a metal coil, of the type to be associated to a vehicle loading platform, comprising: at least one laying base (1);

at least one locking device (2);

said constructive arrangement introduced in structure for fixation of metal coil comprising:

the laying base (1) comprises two adjacent platforms (10), symmetrically opposed and inclined toward a central plane (CP) of the laying base (1);

at least two containment devices (3), said containment devices (3) comprising at least one structural reinforcement device (31);

each one of the referred containment devices (3) comprising at least one concave region (32) centered with the central plane (CP) of the laying base (1);

wherein each containment device (3) includes an articulation point (30) positioned at a lower part thereof such that, in an open position, the containment device (3) is positioned at a base level of the structure.

* * * * *